United States Patent
Hirano et al.

(10) Patent No.: US 12,071,584 B2
(45) Date of Patent: Aug. 27, 2024

(54) DIVERTING AGENT AND METHOD OF FILLING FRACTURE IN WELL USING SAME

(71) Applicant: Mitsubishi Chemical Corporation, Tokyo (JP)

(72) Inventors: Yasuhiro Hirano, Tokyo (JP); Takahiro Saka, Tokyo (JP); Ryosuke Taniguchi, Tokyo (JP); Chizuko Furo, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/352,693

(22) Filed: Jun. 21, 2021

(65) Prior Publication Data

US 2021/0309910 A1    Oct. 7, 2021

Related U.S. Application Data

(63) Continuation of application No. PCT/JP2019/051043, filed on Dec. 25, 2019.

(30) Foreign Application Priority Data

Dec. 27, 2018   (JP) ................. 2018-245096

(51) Int. Cl.
     *C09K 8/508*   (2006.01)
(52) U.S. Cl.
     CPC ................. *C09K 8/5083* (2013.01)
(58) Field of Classification Search
     None
     See application file for complete search history.

(56) References Cited

U.S. PATENT DOCUMENTS

| | | | |
|---|---|---|---|
| 5,661,101 A * | 8/1997 | Washizu | G03C 1/4989 427/152 |
| 2006/0157248 A1 | 7/2006 | Hoefer et al. | |
| 2009/0156436 A1 * | 6/2009 | Drochon | C09K 8/40 507/266 |
| 2012/0015201 A1 * | 1/2012 | Zecha | C08F 218/08 526/204 |

(Continued)

FOREIGN PATENT DOCUMENTS

| | | |
|---|---|---|
| CN | 102344788 A | 2/2012 |
| CN | 107286916 A | 10/2017 |

(Continued)

OTHER PUBLICATIONS

Extended European Search Report issued in EP Patent Application No. 19905493.3, dated Jan. 20, 2022.

(Continued)

*Primary Examiner* — Andrew Sue-Ako
(74) *Attorney, Agent, or Firm* — GREENBLUM & BERNSTEIN, P.L.C.

(57) ABSTRACT

An object of the present invention is to provide a diverting agent that can exhibit sufficient filling properties against a fracture in a well in an excavation method using a hydraulic fracturing method, and that is excellent in solubility after a predetermined period of time has passed. The diverting agent of the present invention contains a polyvinyl alcohol-based resin having an average polymerization degree of 1000 or more.

6 Claims, 2 Drawing Sheets

(56) References Cited

U.S. PATENT DOCUMENTS

| | | | | |
|---|---|---|---|---|
| 2014/0374106 A1* | 12/2014 | Zhu | .......................... | D01D 5/30 |
| | | | | 166/305.1 |
| 2015/0252660 A1* | 9/2015 | Usova | ...................... | E21B 36/00 |
| | | | | 166/308.1 |
| 2015/0337129 A1* | 11/2015 | Sakai | ...................... | C08L 29/04 |
| | | | | 525/56 |
| 2016/0298017 A1 | 10/2016 | Takahashi et al. | | |
| 2017/0174971 A1* | 6/2017 | Kumaki | .................. | C04B 28/02 |
| 2017/0209377 A1* | 7/2017 | Furo | .......................... | A61K 9/20 |
| 2017/0253703 A1 | 9/2017 | Yoshikawa et al. | | |
| 2018/0010037 A1 | 1/2018 | Yoshikawa et al. | | |
| 2020/0071605 A1* | 3/2020 | Ghebremeskel | ...... | E21B 33/138 |

FOREIGN PATENT DOCUMENTS

| | | |
|---|---|---|
| CN | 107286923 A | 10/2017 |
| EP | 3666849 A1 | 6/2020 |
| EP | 3 733 810 A1 | 11/2020 |
| EP | 3733811 A1 | 11/2020 |
| JP | 2016-56272 A | 4/2016 |
| JP | 2016-147971 A | 8/2016 |
| JP | 2016-147972 A | 8/2016 |
| WO | 2015/072317 A1 | 5/2015 |
| WO | 2018/231236 A1 | 12/2018 |

OTHER PUBLICATIONS

Sekisui: "Selvol Polyvinyl alcohol—A versatile high performance polymer", Mar. 30, 2015, pp. 1-9, retrieved from the Internet: URL:http://www.sekisui-sc.com/wp-content/uploads/Selvol PVOH_Brochure_EN.pdf [retrieved on Nov. 7, 2017].

ISR issued in WIPO Patent Application No. PCT/JP2019/051043, Apr. 7, 2020, English translation.

Written Opinion issued in WIPO Patent Application No. PCT/JP2019/051043, Apr. 7, 2020.

Office Action issued in corresponding Chinese Patent Application No. 201980085460.X dated Oct. 20, 2022, along with English translation thereof.

Jiangang Shi, "Reservoir Protection Technology in Shengli Oildom", China University of Petroleum Press, p. 237, 2009, along with English translation thereof.

Office Action issued in the corresponding Chinese Patent Application No. 201980085460.X on Apr. 13, 2023, along with English translation thereof.

Renpu Wan, Yingjun Luo, Xiange Liu et al., "Handbook of Petroleum Production Technology, Fascicule X: Water Shutoff Technique"; 1991; pp. 136-137, with English translation.

Office Action that issued in corresponding Chinese Patent Application No. 201980085460.X dated Dec. 5, 2023, along with English translation thereof.

Office Action that issued in the corresponding Japanese Patent Application No. 2020-563396, dated Oct. 17, 2023, along with its English translation.

Office Action that issued in Japanese Patent Application No. 2020-563396, dated Apr. 23, 2024, along with English translation thereof.

Office Action that issued in European Patent Application No. 19905493.3, dated May 6, 2024, along with English translation thereof.

* cited by examiner

DIVERTING AGENT AND METHOD OF FILLING FRACTURE IN WELL USING SAME

CLAIM FOR PRIORITY

This application is a Continuation of PCT/JP2019/051043 filed Dec. 25, 2019, and claims the priority benefit of Japanese application 2018-245096 filed Dec. 27, 2018, the contents of which are expressly incorporated by reference herein in their entireties.

TECHNICAL FIELD

The present invention relates to a diverting agent and a method of filling a fracture in a well using the diverting agent. More specifically, the present invention relates to a diverting agent to be used during construction of an excavation method using a hydraulic fracturing method, and a method of filling a fracture in a well using the diverting agent.

BACKGROUND ART

For collecting petroleum or other underground resources, a hydraulic fracturing method in which high-pressure water is injected into an underground shale layer to cause fractures is widely adopted. In the hydraulic fracturing method, at first, a vertical hole (vertical well) with a depth of several thousand of meters is excavated vertically by a drill, and then, when the vertical hole reaches the shale layer, a horizontal hole (horizontal well) with a diameter of ten to several tens of centimeters is excavated horizontally. By filling the vertical well and the horizontal well with a fluid and pressurizing the fluid, fractures are generated from the well. Natural gas, petroleum (shale gas/oil), or the like in the shale layer flows out from the fractures, and is then collected. According to such a method, a resource inflow cross-section of the well can be increased by generation of fractures and underground resources can be efficiently collected.

In the hydraulic fracturing method described above, prior to generation of fractures by fluid pressurization, preliminary blasting called perforation is performed in the horizontal well. By such preliminary blasting, borings are made from the well to a production layer. After that, by injecting a fracturing fluid into the well, the fluid flows into these borings, and a load is applied to the borings. Then, fractures are generated in these borings and grow into fractures in a size suitable for resource collection.

In the hydraulic fracturing method, a part of fractures that have already been generated are temporarily filled with an additive called a diverting agent in order to grow fractures that have already been generated larger or to generate more fractures. By temporarily filling a part of the fractures with the diverting agent and pressurizing the fracturing fluid filled in the well in this state, the fluid may enter other fractures, so that other fractures can grow larger or new fractures can be generated.

Since the diverting agent is used to temporarily fill the fractures as described above, a diverting agent which can maintain the shape for a certain period of time and disappears by hydrolysis when natural gas, petroleum, or the like is collected is used. For example, various techniques in which a hydrolyzable resin such as polyglycolic acid or polylactic acid is used as a diverting agent have been proposed.

PTL 1 has proposed a temporary sealing agent for use in well boring, which contains polyglycolic acid having high biodegradability among biodegradable aliphatic polyester-based resins.

PTL 2 has proposed a powder containing particles of polylactic acid which is a biodegradable resin, and in the powder, 50 mass % or more of particles do not pass through a sieve having an opening of 500 μm and the particles have an angle of repose of 51 degrees or more.

Further, PTL 3 has proposed hydrolyzable particles having a dispersion structure in which fine particles of a polyoxalate having a high biodegradability for adjusting the hydrolysis performance of polylactic acid are distributed in the polylactic acid, and having an average particle diameter ($D_{50}$) in a range of 300 μm to 1,000 μm and a roundness, that is, a minor axis/major axis ratio, of 0.8 or more.

Furthermore, PTL 4 has proposed polyoxalate particles having an average particle diameter ($D_{50}$) in a range of 300 μm to 1,000 μm and a roundness, that is, a minor axis/major axis ratio, of 0.8 or more.

CITATION LIST

Patent Literature

PTL 1: WO 2015/072317
PTL 2: JP-A-2016-56272
PTL 3: JP-A-2016-147971
PTL 4: JP-A-2016-147972

SUMMARY OF INVENTION

Technical Problem

In the hydraulic fracturing method, it is necessary to fill the fractures that have already been generated without gaps in order to grow the fractures or generate new fractures. In the conventional diverting agent, a water-insoluble resin such as polyglycolic acid or polylactic acid is used, and there is a problem that it takes a considerable amount of time for removal. Therefore, it has been studied to contain a polyvinyl alcohol-based resin, which is a water-soluble resin, in a diverting agent, since the polyvinyl alcohol-based resin dissolves in water and is quickly removed.

However, the solubility of the polyvinyl alcohol-based resin in water largely depends on the degree of saponification thereof, and a difference in degree of saponification of about 0.1 mol % may occur between production lots. There is a problem that this slight difference makes a division between those meeting the required physical properties and those not meeting the required physical properties.

Therefore, the present invention has been made to solve the above problems, and an object thereof is to provide a diverting agent having a small fluctuation range of solubility at an initial stage of dissolution with respect to a degree of saponification in an excavation method using a hydraulic fracturing method.

Solution to Problem

As a result of intensive studies, the present inventors have found that the polyvinyl alcohol-based resin has excellent solubility in water, and among the polyvinyl alcohol-based resin, a polyvinyl alcohol-based resin having a specific average polymerization degree has a small fluctuation range of solubility at the initial stage of dissolution with respect to the degree of saponification. Thus, the present invention has been completed.

That is, the present invention is characterized in the following (1) to (4).

(1) A diverting agent, containing: a polyvinyl alcohol-based resin having an average polymerization degree of 1000 or more.

(2) The diverting agent according to the above (1), wherein the polyvinyl alcohol-based resin has a degree of saponification of 90 mol % or more.

(3) The diverting agent according to the above (1) or (2), wherein the polyvinyl alcohol-based resin is contained in an amount of 50 mass % or more.

(4) A method of temporarily filling a fracture generated in a well, the method including: allowing the diverting agent according to any one of the above (1) to (3) to flow into a fracture to be filled with a flow of a fluid in the well.

Advantageous Effects of Invention

Because the diverting agent contains a water-soluble polyvinyl alcohol-based resin, the diverting agent of the present invention is rapidly dissolved and removed in a low temperature range, and has good biodegradability. In addition, since the polyvinyl alcohol-based resin having an average polymerization degree of 1000 or more has a small fluctuation range of solubility at the initial stage of dissolution with respect to the degree of saponification, the diverting agent of the present invention can exhibit excellent filling properties for a certain period of time (about 30 minutes to 5 hours) against fractures in the well, regardless of the degree of saponification of the polyvinyl alcohol-based resin used.

Therefore, the diverting agent of the present invention can be suitably used for a hydraulic fracturing method performed in a drilling operation for natural gas, petroleum, or the like. In addition, the polyvinyl alcohol-based resin used is less likely to be out of specifications caused by a difference in degree of saponification.

DESCRIPTION OF EMBODIMENTS

Figure 1:
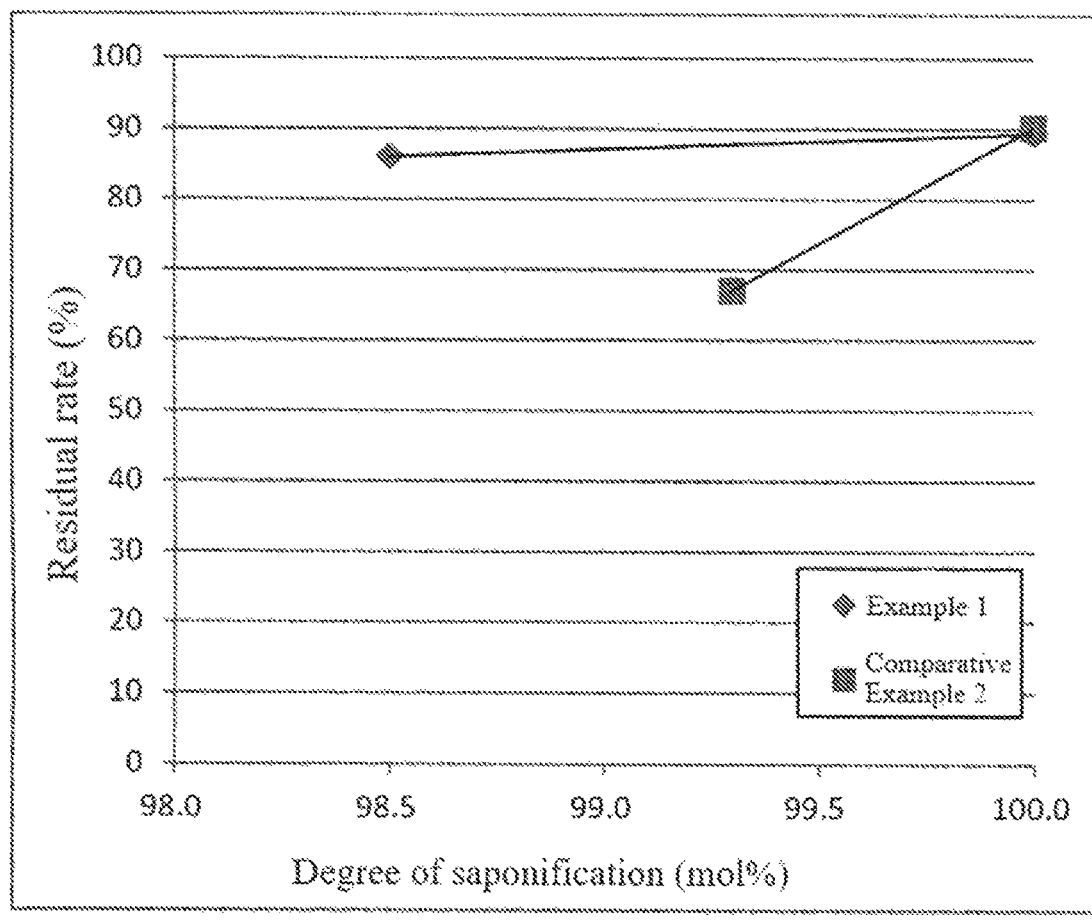
FIG. 1 is a graph showing fluctuations in residual rate with respect to the degree of saponification in Example 1 and Comparative Example 2.

Hereinafter, the present invention will be explained below in detail, but the following explanations only show an example of preferred embodiments, the present invention is not limited thereto.

The term "polyvinyl alcohol" is sometimes simply referred to as "PVA".

In the present description, (meth)allyl means allyl or methallyl, (meth)acryl means acryl or methacryl, and (meth)acrylate means acrylate or methacrylate.

Further, in the present description, "mass" has the same meaning as "weight".

The diverting agent of the present invention contains a polyvinyl alcohol (PVA)-based resin having an average polymerization degree of 1000 or more.

[PVA-Based Resin]

The PVA-based resin for use in the present invention is a resin containing, as a main structural unit, a vinyl alcohol structural unit, and obtained by saponification of a polyvinyl ester-based resin obtained by polymerization of a vinyl ester-based monomer, and has a vinyl alcohol structural unit corresponding to the degree of saponification and a vinyl acetate structural unit of an unsaponified moiety.

In the present invention, examples of the PVA-based resin include a modified PVA-based resin obtained by copolymerizing various monomers during the production of a polyvinyl ester-based resin and being saponified, and a variety of post-modified PVA-based resins obtained by introducing various functional groups into an unmodified PVA-based resin by post-modification, in addition to an unmodified PVA-based resin. Such modification can be performed as long as the water solubility of the PVA-based resin is not lost. In some 25 cases, the modified PVA-based resin may be further post-modified.

The average polymerization degree (measured according to JIS K 6726:1994) of the PVA-based resin for use in the present invention is 1000 or more. When the average polymerization degree of the PVA-based resin is 1000 or more, the fluctuation range of solubility at the initial stage of dissolution in water with respect to the degree of saponification of the PVA-based resin (the fluctuation range ratio of the residual rate of the PVA-based resin to the difference in degree of saponification) is as small as 5 or less, so that the solubility at the initial stage of dissolution is stable regardless of the degree of saponification, and excellent filling properties against fractures in the well can be exhibited. From the viewpoint of production suitability, the average polymerization degree is preferably 1000 to 4000, more preferably 1000 to 3500, and still more preferably 1100 to 3000.

The degree of saponification (measured according to JIS K 6726:1994) of the PVA-based resin is preferably 60 mol % to 100 mol %. When the degree of saponification is too low, the water solubility tends to decrease. From the viewpoint of filling properties against fractures in the fracture, the degree of saponification is preferably 90 mol % or more, and more preferably 95 mol % or more. The upper limit is preferably 99.8 mol % or less, and more preferably 99.5 mol % or less.

The melting point of the PVA-based resin is preferably 140° C. to 250° C., more preferably 150° C. to 245° C., still more preferably 160° C. to 240° C., and particularly preferably 170° C. to 230° C.

The melting point is a value measured with a differential scanning calorimeter (DSC) at a temperature rising/falling rate of 10° C./min.

The viscosity of a 4 mass % aqueous solution of the PVA-based resin is preferably 7 mPa·s to 85 mPa·s, more preferably 8 mPa·s to 80 mPa·s, still more preferably 10 mPa·s to 75 mPa·s, and particularly preferably 12 mPa·s to 70 mPa·s. When the viscosity is too low, the effects of the present application tend to be difficult to obtain, and when the viscosity is too high, the production tends to be difficult.

The viscosity of the 4 mass % aqueous solution of the PVA-based resin is a viscosity at 20° C. measured in accordance with JIS K 6726:1994, by preparing a 4 mass % aqueous solution of the PVA-based resin.

When the PVA-based resin for use in the present invention is made into a 1 mass % aqueous solution, the residual rate of PVA-based resin after being left at 23° C. for 60 minutes becomes a linear function in the range of 90 mol % to 99.9 mol % of the degree of saponification. It is preferable that the slope of the linear function, that is, the fluctuation range ratio of the residual rate of the PVA-based resin with respect to the difference in degree of saponification is greater than 0 and 5 or less. The residual rate with respect to the degree of saponification is expressed by a linear function, and when the slope of the linear function at a degree of saponification of 90 mol % or more is 5 or less, the fluctuation range of solubility at the initial stage of dissolution in water with respect to the degree of saponification of the PVA-based rosin becomes small. Therefore, it can be seen that stable initial solubility can be obtained regardless of the degree of saponification. Such a PVA-based resin can exhibit excellent filling properties against fractures in the well. The slope is more preferably greater than 0 and 4 or less, and still more preferably greater than 0 and 3 or less.

In the present invention, a modified PVA-based resin into which a functional group is introduced may be used as the PVA-based resin. For example, preferred is a PVA-based resin having a primary hydroxy group in the side chain or an ethylene-modified PVA-based resin, and particularly preferred is a PVA-based resin having a primary hydroxy group in the side chain in terms of being excellent in melt moldability. The number of the primary hydroxy group in the PVA-based resin having a primary hydroxy group in the side chain is preferably 1 to 5, more preferably 1 to 2, and particularly preferably 1. In addition to the primary hydroxy group, a secondary hydroxy group is preferably contained.

Examples of such a PVA-based resin having a primary hydroxy group in the side chain include a modified PVA-based resin having a 1,2-diol structural unit in the side chain and a modified PVA-based resin having a hydroxyalkyl group structural unit in the side chain. Among these, it is particularly preferable to use a modified PVA-based resin having a 1,2-diol structural unit in the side chain (hereinafter, may be referred to as "modified PVA-based resin having a side-chain 1,2-diol structural unit") represented by the following general formula (1).

The moiety other than the 1,2-diol structural unit is a vinyl alcohol structural unit and a vinyl ester structural unit in an unsaponified moiety, similar to a general PVA-based resin.

[Chem. 1]

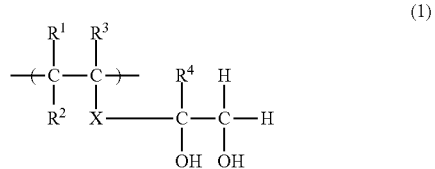
(1)

(In the general formula (1), $R^1$ to $R^4$ each independently represent a hydrogen atom or an alkyl group having 1 to 4 carbon atoms, and X represents a single bond or a bond chain.)

In the above general formula (1), $R^1$ to $R^4$ each independently represent a hydrogen atom or an alkyl group having 1 to 4 carbon atoms. $R^1$ to $R^4$ are preferably all hydrogen atoms, however may be an alkyl group having 1 to 4 carbon atoms as long as the resin properties are not remarkably impaired. The alkyl group is not particularly limited, and is preferably, for example, a methyl group, an ethyl group, an n-propyl group, an isopropyl group, an n-butyl group, an isobutyl group, and a tert-butyl group. The alkyl group may have a substituent such as a halogen group, a hydroxy group, an ester group, a carboxylic acid group, or a sulfonic acid group as needed.

In the above general formula (1), X is a single bond or a bond chain, preferably a single bond in terms of thermal stability and stability under high temperature and acidic conditions, but may be a bond chain as long as the effect of the present invention is not impaired.

Such a bond chain is not particularly limited, and examples thereof include hydrocarbon groups such as an alkylene group, an alkenylene group, an alkynylene group, a phenylene group, and a naphthylene group (these hydrocarbon groups may be substituted with a halogen atom such as a fluorine atom, a chlorine atom or a bromine atom), —O—, —($CH_2O$)$_m$—, —($OCH_2$)$_m$—, —($CH_2O$)$_m CH_2$—, —CO—, —COCO—, —CO($CH_2$)$_m$CO—, —CO($C_6H_4$)CO—, —S—, —CS—, —SO—, —$SO_2$—, —NR—, —CONR—, —NRCO—, —CSNR—, —NRCS—, —NRNR—, —$HPO_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O—. Each R is independently a hydrogen atom or an optional substituent, and is preferably a hydrogen atom or an alkyl group (particularly an alkyl group having 1 to 4 carbon atoms). In addition, m is a natural number, and is preferably 1 to 10, particularly preferably 1 to 5. Among these, the bond chain is preferably an alkylene group having 6 or less carbon atoms, particularly a methylene group, or —$CH_2OCH_2$— in terms of viscosity stability and heat resistance during production.

In a particularly preferred structure of the 1,2-diol structural unit represented by the general formula (1), $R^1$ to $R^4$ are all hydrogen atoms, and X is a single bond.

In a case where the PVA-based resin is a modified PVA-based resin, the modification rate in this modified PVA-based resin, that is, the content of a structural unit derived from various monomers in the copolymer, or the content of functional groups introduced by a post-reaction cannot be said unconditionally because the characteristics vary greatly depending on the type of functional group, and is preferably 0.1 mol % to 20 mol %.

For example, the modification rate when the PVA-based resin is the modified PVA-based resin having a side-chain 1,2-diol structural unit is preferably 0.1 mol % to 20 mol %, more preferably 0.5 mol % to 10 mol %, still more preferably 1 mol % to 8 mol %, and particularly preferably 1 mol % to 3 mol %. When the modification rate is too high, the fractures in the well cannot be filled temporarily, and when the modification rate is too low, the solubility after a certain period of time tends to deteriorate.

The content (modification rate) of the 1,2-diol structural unit in the PVA-based resin can be determined from a $^1$H-NMR spectrum (solvent: DMSO-$d_6$, internal standard: tetramethylsilane) of a PVA-based resin having a degree of saponification of 100 mol %. Specifically, the content can be calculated based on the peak areas derived from a hydroxy proton, a methine proton, and a methylene proton in the 1,2-diol structural unit, a methylene proton in the main chain, a proton of a hydroxy group linked to the main chain, and the like.

The modification rate when the PVA-based resin is an ethylene-modified PVA-based resin is preferably 0.1 mol % to 15 mol %, more preferably 0.5 mol % to 10 mol %, still more preferably 1 mol % to 10 mol %, and particularly preferably 5 mol % to 9 mol %. When the modification rate is too high, the water solubility tends to decrease; when the modification rate is too low, the melt molding tends to be difficult.

Examples of a method for producing the PVA-based resin used in the present invention include a method of polymerizing vinyl ester-based monomers and performing saponification of the obtained polyvinyl ester polymer.

Examples of the vinyl ester-based monomer include vinyl acetate, vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl piperate, vinyl octylate, vinyl monochloroacetate, vinyl adipate, vinyl methacrylate, vinyl crotonate, vinyl sorbate, vinyl benzoate, vinyl cinnamate, and vinyl trifluoroacetate. From the viewpoint of price and availability, vinyl acetate is preferably used.

Examples of the monomer for use in the copolymerization of the vinyl ester-based monomer in the production of the vinyl ester-based resin include: olefins such as ethylene, propylene, isobutylene, α-octene, α-dodecene, and α-octadecene; unsaturated acids such as an acrylic acid, a methacrylic acid, a crotonic acid, a maleic acid, a maleic anhydride, and an itaconic acid, or a salt thereof, a mono-, di-alkyl ester thereof or the like; nitriles such as acrylonitrile and methacrylonitrile; amides such as acrylamide and methacrylamide; olefin sulfonic acids such as an ethylene sulfonic acid, an allyl sulfonic acid, and a methallyl sulfonic acid or a salt thereof; alkyl vinyl ethers; N-acrylamidomethyltrimethylammonium chloride; allyltrimethylammonium chloride; dimethylallyl vinyl ketone; N-vinyl pyrrolidone; vinyl chloride; vinylidene chloride; polyoxyalkylene(meth)allyl ethers such as polyoxyethylene(meth)allyl ether and polyoxypropylene(meth)allyl ether; polyoxyalkylene (meth) acrylates such as polyoxyethylene(meth)acrylate and polyoxypropylene(meth)acrylate; polyoxyalkylene (meth)acrylamides such as polyoxyethylene(meth)acrylamide and polyoxypropylene(meth)acrylamide; polyoxyethylene [1-(meth)acrylamide-1,1-dimethylpropyl]ester; polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; and hydroxy group-containing α-olefins such as 3-buten-1-ol, 4-penten-1-ol, and 5-hexen-1-ol, or derivatives such as an acylated product thereof.

In addition, examples thereof include diol-containing compounds such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, 5,6-diacyloxy-1-hexene, glycerin monoallyl ether, 2,3-diacetoxy-I-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane.

The polymerization of the vinyl ester-based monomers or the polymerization of the vinyl ester-based monomer and a copolymerizable monomer can be performed by any known polymerization method such as solution polymerization, suspension polymerization, and emulsion polymerization. Among these, it is preferable to perform the solution polymerization which can remove reaction heat efficiently under reflux.

Examples of a solvent for use in the polymerization include aliphatic alcohols having 1 to 4 carbon atoms such as methanol, ethanol, isopropyl alcohol, n-propanol, and butanol, or ketones such as acetone and methyl ethyl ketone. A lower alcohol having 1 to 3 carbon atoms is preferably used.

For the saponification of the obtained polymer, a conventional known saponification method can be employed. That is, the saponification can be performed using an alkali catalyst or an acid catalyst in a state where the polymer is dissolved in an alcohol or a water/alcohol solvent.

As the alkali catalyst, for example, alkali metal hydroxides such as potassium hydroxide, sodium hydroxide, sodium methylate, sodium ethylate, potassium methylate, and lithium methylate, or alcoholate can be used.

Among these, saponification is preferably performed by a transesterification reaction using an alkali catalyst in the presence of an anhydrous alcohol solvent in terms of reaction rate or reduction of impurities such as fatty acid salts.

The reaction temperature of the saponification reaction is preferably 20° C. to 60° C. When the reaction temperature is too low, the reaction rate tends to decrease and the reaction efficiency tends to decrease; when the reaction temperature is too high, the reaction temperature may exceed the boiling point of the reaction solvent, and the safety in production tends to decrease. In a case of performing the saponification under a high pressure using a tower-type continuous saponification tower with high pressure resistance, the saponification can be performed at a higher temperature, for example, 80° C. to 150° C., and a PVA-based resin having a high degree of saponification can be obtained in a short time even using a small amount of saponification catalyst.

The modified PVA-based resin having a side-chain 1,2-diol structural unit can be produced by a known production method. For example, the above modified PVA-based resin can be produced by a method described in JP-A-2002-284818, JP-A-2004-285143, or JP-A-2006-95825. That is, the above modified PVA-based resin can be produced by (i) a method of saponifying a copolymer of a vinyl ester-based monomer and a compound represented by the following general formula (2), (ii) a method of saponifying and decarboxylating a copolymer of a vinyl ester-based monomer and a vinyl ethylene carbonate represented by the following general formula (3), (iii) a method of saponifying and deketalizing a copolymer of a vinyl ester-based monomer and a 2,2-dialkyl-4-vinyl-1,3-dioxolane represented by the following general formula (4), or the like.

[Chem. 2]

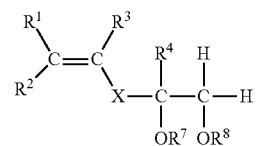

(2)

(In the general formula (2), $R^1$ to $R^4$ each independently represent a hydrogen atom or an alkyl group having 1 to 4 carbon atoms, X represents a single bond or a bond chain, and $R^7$ and $R^8$ each independently represent a hydrogen atom or $R^9$—CO— (wherein, $R^9$ is an alkyl group having 1 to 4 carbon atoms).)

[Chem. 3]

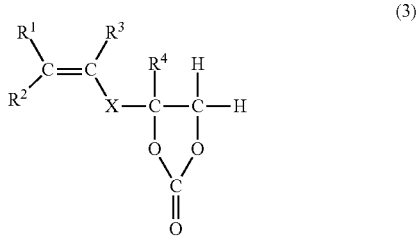

(3)

(In the general formula (3), $R^1$ to $R^4$ each independently represent a hydrogen atom or an alkyl group having 1 to 4 carbon atoms, and X represents a single bond or a bond chain.)

[Chem. 4]

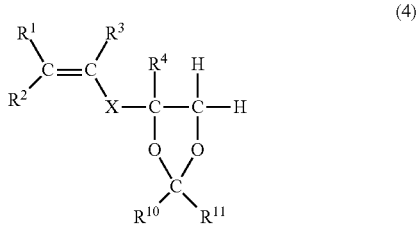

(4)

(In the general formula (4), $R^1$ to $R^4$ each independently represent a hydrogen atom or an alkyl group having 1 to 4 carbon atoms, X represents a single bond or a bond chain, and $R^{10}$ and $R^{11}$ each independently represent a hydrogen atom or an alkyl group having 1 to 4 carbon atoms.)

Specific examples and preferred examples of $R^1$ to $R^4$ and X in the general formulas (2) to (4) are the same as those in the above general formula (1), and specific examples and preferred examples of the alkyl group having 1 to 4 carbon atoms of $R^7$ to $R^{11}$ are also the same as those of the general formula (1).

Among the above methods (i) to (iii), the method (i) is preferred in that copolymerization reactivity and industrial handling are excellent. In particular, as the compound represented by the general formula (2), it is preferable to use 3,4-diacyloxy-1-butene in which $R^1$ to $R^4$ are hydrogen atoms, X is a single bond, $R^7$ and $R^8$ are $R^9$—CO—, and $R^9$ is an alkyl group having 1 to 4 carbon atoms. Among these, 3,4-diacetoxy-1-butene in which $R^9$ is a methyl group is particularly preferably used.

The PVA-based resin for use in the present invention is used in the form of particles. The shape of the particles is not particularly limited, and examples thereof include a spherical shape, a powder shape, an elliptical shape, a columnar shape (pellet), a plate shape, a cubic shape, a rectangular shape, a prismatic shape, and a polygonal shape.

The particle diameter of the PVA-based resin particles is appropriately adjusted in consideration of the size of the fractures in the well, the shape of the particles, and the like, and is preferably in the range of 0.1 mm to 5 mm.

Specifically, in a case where the PVA-based resin particles are columnar (pellets), for the particle diameter thereof, the diameter of the cross section orthogonal to the axial direction is preferably 0.5 mm to 5.0 mm, more preferably 1.0 mm to 4.5 mm, and still more preferably 1.5 mm to 4.0 mm, and the thickness (length in the axial direction) is preferably 0.5 mm to 5.0 mm, more preferably 1.0 mm to 4.5 mm, and still more preferably 1.5 mm to 4.0 mm.

In a case where the PVA-based resin particles are spherical particles, the particles are preferably in the form of powder, and the average particle diameter thereof is 10 μm to 2,000 μm, and preferably 100 μm to 1,000 μm.

The average particle diameter can be measured by a dry sieving test method (see JIS8815). In the present description, the particle diameter is a particle diameter at which the total volume on sieve is 50%.

When the sizes (the diameter, the length, and the average particle diameter) are too large, the water solubility tends to decrease, and when the sizes are too small, the sealing effect tends to decrease.

The PVA-based resin for use in the present invention may be composed of one type of resin, or may be a mixture of two or more types of resins. In the case of using two or more types of PVA-based resins, for example, a combination of two or more unmodified PVA-based resins with different degrees of saponification, average polymerization degrees, or melting points; a combination of an unmodified PVA-based resin and a modified PVA-based resin; a combination of two or more modified PVA-based resins with different degrees of saponification, average polymerization degrees, melting points, functional group types or modification rates; a combination of a PVA-based resin produced by melt molding and a PVA-based resin obtained without melt molding; or a combination of PVA-based resins with different shapes or particle diameters is used.

[Diverting Agent]

The diverting agent of the present invention contains the above PVA-based resin in the form of resin particles.

The content of the PVA-based resin is preferably 50 mass % or more, that is, 50 mass % to 100 mass %, more preferably 80 mass % to 100 mass %, and still more preferably 90 mass % to 100 mass % with respect to the entire diverting agent. When the content is too small, the effects of the present invention tend to be difficult to obtain.

In addition to the PVA-based resin, additives (agents) such as sand, iron, ceramic, and other biodegradable resins can be blended in the diverting agent of the present invention as long as the effect of the present invention is not impaired.

The amount of the additive (agent) to be blended is preferably 50 mass % or less, more preferably 20 mass % or less, and still more preferably 10 mass % or less with respect to the entire diverting agent.

The diverting agent can be produced by uniformly mixing the PVA-based resin of the present invention and other additives (agents).

When petroleum, natural gas, or the like is excavated in a hydraulic fracturing method, the diverting agent of the present invention enters fractures or fissures formed in the well, and then temporarily fills the fractures or fissures, so that new fractures or fissures can be formed. As a method for filling the fractures or fissures, the diverting agent of the present invention is allowed to flow into the fracture to be filled with a flow of fluid in the well.

Further, since the diverting agent of the present invention is water-soluble and biodegradable, the diverting agent is rapidly dissolved in water and removed after use, and is then biodegraded. Therefore, the environmental load is small, and the diverting agent is very useful.

EXAMPLES

Hereinafter, the present invention will be described more specifically with reference to Examples and Comparative Examples, but the present invention is not limited to these Examples. In the following Examples and Comparative Examples, "parts" and "%" are based on mass unless otherwise specified.

Example 1

<Production of PVA-Based Resin Particles>
1. Production of Modified PVA-Based Resin Particles (PVA-1)

Into a reaction can equipped with a reflux condenser, a dripping device, and a stirrer, 100 parts of vinyl acetate, 6.3 parts of methanol and 2 parts of 3,4-diacetoxy-1-butene were charged, the temperature was raised under a nitrogen stream while stirring to reach the boiling point, and then 0.004 part of acetyl peroxide was added to start polymerization. The reaction was continued for 6.5 hours from the start of polymerization, and when the polymerization rate of vinyl acetate was 49%, a predetermined amount of hydroquinone monomethyl ether was added to complete the polymerization, and then distillation was performed while blowing methanol vapor to remove unreacted vinyl acetate monomer out of the system to obtain a methanol solution of a copolymer.

Then, the above solution was diluted with methanol and adjusted to have a solid content concentration of 36%, and this methanol solution was charged into a kneader. The solution temperature was maintained at 35° C., and a methanol solution of 2% sodium hydroxide (in terms of sodium) was added in an amount of 1.5 mmol with respect to 1 mol (total amount) of vinyl acetate structural units and 3,4-diacetoxy-1-butene structural units in the copolymer, thereby performing saponification. As the saponification proceeded, a saponified product was precipitated, and when the saponified product was turned into particles, a methanol solution of 2% sodium hydroxide (in terms of sodium) was further added in an amount of 9.0 mmol with respect to 1 mol (total amount) of vinyl acetate structural units and 3,4-diacetoxy-1-butene structural units, thereby performing saponification. Thereafter, acetic acid for neutralization was added in an amount corresponding to 0.8 equivalent of sodium hydroxide. The saponified product was filtered, well washed with methanol and dried in a hot air dryer, to obtain modified PVA-based resin particles having a side-chain 1,2-diol structural unit (side-chain 1,2-diol structural unit-containing modified PVA-based resin particles, PVA-1).

The obtained PVA-1 was in the form of powder, and the average particle diameter was 450 μm after sieving by a dry sieving test method and calculating the diameter at which the integrated value became 50%.

The degree of saponification of PVA-1 was analyzed by alkali consumption required for hydrolysis of the residual vinyl acetate and 3,4-diacetoxy-1-butene structural units in the resin, and was found to be 98.5 mol %. The average polymerization degree was 2800 when analyzed according to JIS K 6726:1994.

In PVA-1, the content (modification rate) of the 1,2-diol structural unit represented by the above formula (1) was calculated based on an integrated value determined by $^1$H-NMR (300 MHz proton NMR, a $d_6$-DMSO solution, internal standard substance: tetramethylsilane, 50° C.), and was found to be 1 mol %.

2. Production of Modified PVA-Based Resin Particles (PVA-2)

To 160 g of methanol, 0.6 g of sodium hydroxide was charged, and the dissolution was conformed. Then, 20 g of the above PVA-1 was weighed and put in, and the mixture was stirred at 50° C. for 3 hours to neutralize, thereby performing a retreatment of saponification treatment.

The obtained side-chain 1,2-diol structural unit-containing modified PVA-based resin particles (PVA-2) had a degree of saponification of 100 mol %, an average polymerization degree of 2800, a content (modification rate) of the 1,2-diol structural unit of 1 mol %, and an average particle diameter of 450 μm.

<Measurement of Residual Rate of PVA-Based Resin>

For PVA-1 and PVA-2, the residual rate when immersed in an aqueous solution at 23° C. for 60 minutes was measured.

«Measurement Method»

A 140 mL glass container with a lid containing 100 g of water was put into a thermostatic chamber, and the water temperature was set to 23° C. The long sides of 120 mesh (aperture: 125 μm, 10 cm×7 cm) made of nylon were folded in half, and both ends were heat-sealed to obtain a bag-like mesh (5 cm×7 cm).

1 g of the PVA-based resin particles were put into the obtained bag-like mesh, the opening was heat-sealed to obtain a bag-like mesh containing the PVA-based resin, and then the mass was measured. The bag-like mesh containing the PVA-based resin was immersed in the glass container. After standing for 60 minutes in the thermostatic chamber at 23° C., the bag-like mesh containing the PVA-based resin was taken out of the glass container and dried at 140° C. for 3 hours, and then the mass of the bag-like mesh containing the PVA-based resin was measured. The mass of the PVA-based resin remaining in the bag-like mesh was calculated based on the mass before immersion, and the residual rate after 60 minutes of the PVA-based resin was calculated according to the following equation. The results are shown in Table 1.

In following equation, the solid fraction (mass %) of the PVA-based resin can be calculated by drying the PVA-based resin at 105° C. for 3 hours and measuring the mass of the PVA-based resin before and after drying.

Residual rate (%)={weight (g) of PVA-based resin residue after drying/(initial weight (g) of PVA-based resin×solid fraction (mass %) of PVA-based resin)/100}×100

<Measurement of Fluctuation Range Ratio of Residual Rate of PVA-Based Resin with Respect to Difference in Degree of Saponification>

Based on the residual rate of each of PVA-1 and PVA-2 measured by the above <Measurement of Residual rate of PVA-based Resin>, the fluctuation range ratio of the residual rate of the PVA-based resin after 60 minutes to the difference in degree of saponification was calculated according to the following equation. The results are shown in Table 1.

Fluctuation range ratio=(residual rate (%) of PVA-2−residual rate (%) of PVA-1)/(degree of (mol %) of PVA-2−degree of saponification (mol %) of PVA-1)

Example 2

1. Production of Unmodified PVA-Based Resin Particles (PVA-3)

Into a reaction can equipped with a reflux condenser, a dropping device, and a stirrer, 100 parts of vinyl acetate and 33 parts of methanol were charged, the temperature was raised under a nitrogen stream while stirring to reach the boiling point, and then 1.3 parts of acetyl peroxide was charged to start polymerization. When the polymerization rate of vinyl acetate was 78%, a predetermined amount of hydroquinone monomethyl ether was added to complete the polymerization, and then distillation was performed while blowing methanol vapor to remove unreacted vinyl acetate monomer out of the system to obtain a methanol solution of a vinyl acetate polymer.

Then, the above solution was diluted with methanol and adjusted to have a solid content concentration of 47%, and this methanol solution was charged into a kneader. The solution temperature was maintained at 35° C., and a methanol solution of 2% sodium hydroxide (in terms of sodium) was added in an amount of 7 mmol with respect to 1 mol of vinyl acetate structural units, thereby performing saponification. As the saponification proceeded, a saponified product was precipitated, and when the saponified product was turned into particles, the saponified product was filtered, washed well with methanol and dried in a hot-air dryer, to obtain unmodified PVA-based resin particles (PVA-3). The obtained PVA-3 was in the form of power having an average particle diameter of 600 μm.

The degree of saponification of PVA-3 was analyzed by alkali consumption required for hydrolysis of the residual vinyl acetate structural units in the resin, and was found to be 99.0 mol %. The viscosity average polymerization degree was analyzed according to JIS K6726, and was found to be 2000.

2. Production of Unmodified PVA-Based Resin Particles (PVA-4)

A retreatment of saponification treatment same as in "2. Production of modified PVA-based resin particles (PVA-2)" in Example 1 was performed using the unmodified PVA-based resin particles (PVA-3) obtained above.

The obtained unmodified PVA-based resin particles (PVA-4) had a degree of saponification of 100 mol %, an average polymerization degree of 2000, and an average particle diameter of 600 μm.

For PVA-3 and PVA-4, the residual rate of the PVA-based resin was calculated in the same manner as in Example 1, and the fluctuation range ratio of the residual rate of the PVA-based resin to the difference in degree of saponification was calculated based on the result. The results are shown in Table 1.

Comparative Example 1

1. Production of Unmodified PVA-Based Resin Particles (PVA-5)

Unmodified PVA-based resin particles (PVA-5) were obtained in the same manner as in the method for producing PVA-3 of Example 2, except that the methanol was changed to 34.5 parts, the reaction was continued for 9.5 hours, the polymerization was completed when the polymerization rate was 89%, the solid content concentration during saponification was changed to 50%, the methanol solution of 2% sodium hydroxide (in terms of sodium) was changed to 4.8 mmol, and additionally 7.5 mmol thereof was added.

PVA-5 had a degree of saponification of 98.9 mol %, an average polymerization degree of 500, and an average particle diameter of 610 μm.

2. Production of Unmodified PVA-Based Resin Particles (PVA-6)

A retreatment of saponification treatment same as in "2. Production of modified PVA-based resin particles (PVA-2)" in Example 1 was performed using the unmodified PVA-based resin particles (PVA-5) obtained above.

The obtained unmodified PVA-based resin particles (PVA-6) had a degree of saponification of 100 mol %, an average polymerization degree of 500, and an average particle diameter of 610 μm.

For PVA-5 and PVA-6, the residual rate of the PVA-based resin was calculated in the same manner as in Example 1, and the fluctuation range ratio of the residual rate of the PVA-based resin to the difference in degree of saponification was calculated based on the result. The results are shown in Table 1.

Comparative Example 2

1. Production of Modified PVA-Based Resin Particles (PVA-7)

Side-chain 1,2-diol structural unit-containing modified PVA-based resin particles (PVA-7) were obtained in the same manner as in "1. Production of modified PVA-based resin particles (PVA-1)" of Example 1, except that the methanol was changed to 32.5 parts, the reaction was continued for 11 hours, the polymerization was completed when the polymerization rate was 91%, the solid content concentration during saponification was adjusted to 50%, the methanol solution of 2% sodium hydroxide (in terms of sodium) was changed to 4.5 mmol, and additionally 7.5 mmol thereof was added.

The obtained PVA-7 had a degree of saponification of 99.3 mol %, an average polymerization degree of 450, a content (modification rate) of the 1,2-diol structural unit of 1 mol %, and an average particle diameter of 750 μm.

2. Production of Modified PVA-Based Resin Particles (PVA-8)

A retreatment of saponification treatment same as in "2. Production of modified PVA-based resin particles (PVA-2)" in Example 1 was performed using the side-chain 1,2-diol structural unit-containing modified PVA-based resin particles (PVA-7) obtained above. The obtained PVA-8 had a degree of saponification of 100 mol %, an average polymerization degree of 450, a content (modification rate) of the 1,2-diol structural unit of 1 mol %, and an average particle diameter of 750 μm.

For PVA-7 and PVA-8, the residual rate of the PVA-based resin was calculated in the same manner as in Example 1, and the fluctuation range ratio of the residual rate of the PVA-based resin to the difference in degree of saponification was calculated based on the result. The results are shown in Table 1.

Figure 2:
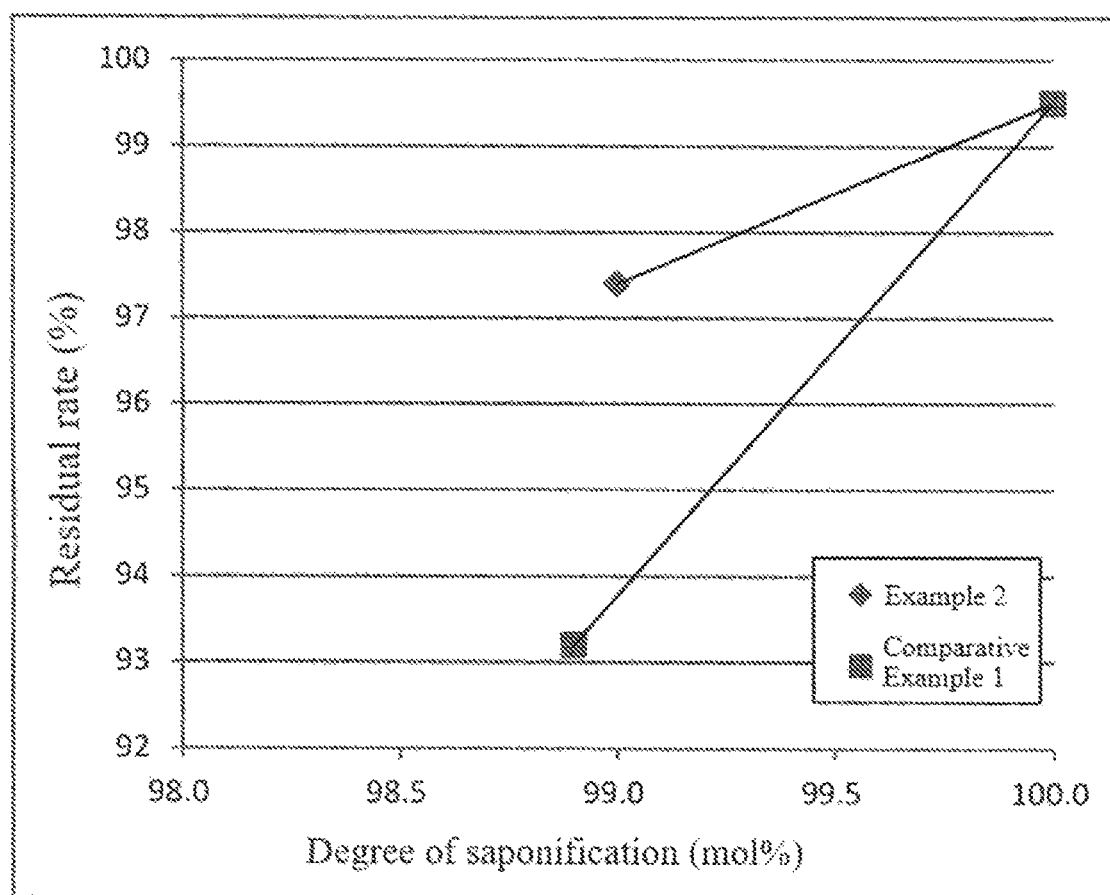
FIG. 2 is a graph showing fluctuations in residual rate with respect to the degree of saponification in Example 2 and Comparative Example 1.

FIG. 1 shows fluctuations in residual rate with respect to the degree of saponification in Example 1 and Comparative Example 2. FIG. 2 shows fluctuations in residual rate with respect to the degree of saponification in Example 2 and Comparative Example 1.

TABLE 1

| | PVA No. | Degree of saponification (mol %) | Polymerization degree | Modification type | Modification rate (mol %) | Residual rate (%) 23° C., 60 min | Fluctuation range ratio |
|---|---|---|---|---|---|---|---|
| Example 1 | PVA-1 | 98.5 | 2800 | 1,2-diol | 1 | 86 | 2.3 |
| | PVA-2 | 100 | | | | 89.4 | |
| Example 2 | PVA-3 | 99.0 | 2000 | Unmodified | — | 97.4 | 1.8 |
| | PVA-4 | 100 | | | | 99.5 | |
| Comparative Example 1 | PVA-5 | 98.9 | 500 | Unmodified | — | 93.2 | 5.8 |
| | PVA-6 | 100 | | | | 99.5 | |
| Comparative Example 2 | PVA-7 | 99.3 | 450 | 1,2-diol | 1 | 67.1 | 33.1 |
| | PVA-8 | 100 | | | | 90.3 | |

As seen from the results in Table 1 and FIGS. 1 and 2, in Examples 1 and 2, the fluctuation range ratio of the residual rate of the PVA-based resin to the difference in degree of saponification was 5 or less, which was lower than that of Comparative Examples 1 and 2, and the solubility at the initial stage of dissolution was stable. Therefore, it was found that when Examples 1 and 2 were used as a diverting agent, the fluctuation range of solubility at the initial stage of dissolution with respect to the degree of saponification was small, so that excellent filling properties against fractures in the well could be exhibited.

Although the present invention has been described in detail with reference to specific embodiments, it will be apparent to those skilled in the art that various changes and modifications can be made without departing from the spirit and scope of the present invention. The present application is based on a Japanese Patent Application (Japanese Patent Application No. 2018-245096) filed on Dec. 27, 2018, contents of which are incorporated herein by reference.

The invention claimed is:

1. A diverting agent, comprising:
a polyvinyl alcohol-based resin having an average polymerization degree of 2800 to 4000; wherein
the polyvinyl alcohol-based resin has a degree of saponification in the range of from 60 mol % to 98.5 mol %, and
the polyvinyl alcohol-based resin is a modified polyvinyl alcohol-based resin, the modified polyvinyl alcohol-based resin being a polyvinyl alcohol-based resin having a primary hydroxy group in a side chain or an ethylene-modified polyvinyl alcohol-based resin.

2. The diverting agent according to claim 1, wherein the degree of saponification of the polyvinyl alcohol-based resin is in the range of from 90 mol % to 98.5 mol %.

3. The diverting agent according to claim 1, wherein the polyvinyl alcohol-based resin is contained in an amount of 50 mass % or more.

4. The diverting agent according to claim 1, wherein the modified polyvinyl alcohol-based resin is the ethylene-modified polyvinyl alcohol-based resin.

5. The diverting agent according to claim 1, wherein a modification rate of the modified polyvinyl alcohol-based resin is 0.1 mol % to 20 mol %.

6. A method of temporarily filling a fracture generated in a well, the method comprising:
allowing the diverting agent according to claim 1 to flow into a fracture to be filled with a flow of a fluid in the well.

\* \* \* \* \*